United States Patent
Yang et al.

(12)

(10) Patent No.: US 6,417,501 B1
(45) Date of Patent: Jul. 9, 2002

(54) IMAGE PROCESSING METHOD FOR AN IMAGE PROCESSING SYSTEM HAVING A CHANGED IMAGE

(75) Inventors: Po-Chin Yang, Tainan; Chien-Hsing Tang, Taoyuan Hsien, both of (TW)

(73) Assignee: Acer Communications and Multimedia Inc., Taoyuan (TW)

( * ) Notice: Subject to any disclaimer, the term of this patent is extended or adjusted under 35 U.S.C. 154(b) by 114 days.

(21) Appl. No.: 09/664,430

(22) Filed: Sep. 18, 2000

(30) Foreign Application Priority Data

Feb. 18, 2000  (TW) ...................................... 891028749 A

(51) Int. Cl.⁷ .............................................. H01L 27/00
(52) U.S. Cl. ..................... 250/208.1; 382/305
(58) Field of Search .................... 250/208.1, 559.1; 348/302, 578, 581, 590; 382/305, 307, 256, 258, 266–268

(56) References Cited

U.S. PATENT DOCUMENTS 5,676,256 A  * 10/1997  Kumar et al. ................ 209/580

* cited by examiner

Primary Examiner—Que T. Le
(74) Attorney, Agent, or Firm—Winston Hsu

(57) ABSTRACT

An image processing system has a memory for storing programs, an unprocessed image and a processor for executing the programs in the memory. The image is a plurality of pixels arranged as a matrix, and each pixel has several color parameters. The image has at least one image region. One of the color parameters is adjusted according to an initial image adjusting value. Then, in one direction of up, down, left or right, the image adjusting value is successively changed by adding a fixed value, or multiplying by a fixed factor. Each successive pixel has its color parameter adjusted by adding the image adjusting value to it. Image adjustment proceeds in this way from the image region to an outer region along the predetermined direction.

13 Claims, 4 Drawing Sheets

|   |   |   |   |   |   |   |   |   |   |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 5 | 0 | 0 | 0 | 0 | 0 | 0 | 0 |
| 0 | 0 | 5 | 0 | 5 | 0 | 0 | 0 | 0 | 0 |
| 0 | 0 | 5 | 5 | 5 | 0 | 0 | 0 | 0 | 0 |
| 0 | 0 | 5 | 5 | 5 | 0 | 0 | 0 | 0 | 0 |
| 0 | 0 | 5 | 5 | 5 | 0 | 0 | 0 | 0 | 0 |
| 0 | 5 | 5 | 0 | 5 | 5 | 0 | 0 | 0 | 0 |
| 0 | 5 | 0 | 0 | 0 | 5 | 5 | 0 | 0 | 0 |
| 5 | 0 | 0 | 0 | 0 | 0 | 5 | 0 | 0 | 0 |

Fig. 5

|   |   |   |   |   |   |   |   |   |   |
|---|---|---|---|---|---|---|---|---|---|
| 0 | 0 | 3 | 2 | 2 | 1 | 0 | 0 | 0 | 0 |
| 0 | 0 | 4 | 3 | 3 | 2 | 1 | 0 | 0 | 0 |
| 0 | 0 | 5 | 4 | 4 | 3 | 2 | 0 | 0 | 0 |
| 0 | 1 | 5 | 4 | 5 | 4 | 3 | 2 | 1 | 0 |
| 0 | 2 | 5 | 5 | 5 | 4 | 3 | 2 | 1 | 0 |
| 1 | 3 | 5 | 5 | 5 | 4 | 3 | 2 | 1 | 0 |
| 2 | 4 | 5 | 5 | 5 | 4 | 3 | 2 | 1 | 0 |
| 3 | 5 | 5 | 4 | 5 | 5 | 4 | 3 | 2 | 1 |
| 4 | 5 | 4 | 3 | 2 | 5 | 5 | 4 | 3 | 2 |
| 5 | 4 | 3 | 2 | 1 | 0 | 5 | 4 | 3 | 2 |

Fig. 6

IMAGE PROCESSING METHOD FOR AN IMAGE PROCESSING SYSTEM HAVING A CHANGED IMAGE

BACKGROUND OF THE INVENTION

1. Field of the Invention

The present invention deals with an image processing system. More specifically, the present invention discloses an image processing system that gradually changes pixel characteristics along a predetermined direction.

2. Description of the Prior Art

Please refer to FIGS. 1 and 2. FIG. 1 is a block diagram for a conventional image processing system 10, and FIG. 2 is a diagram for an image 14 in FIG. 1. The image processing system 10 comprises memory 12 for storing programs and an unprocessed image 14, and a processor 16 used for executing the program stored in the memory 12.

In a conventional image processing method, 24 bits are used to represent the color of each pixel. Each of the colors, red (R), green (G) and blue (B) has 8 bits of intensity information. Although red, green and blue (RGB) color information is usually used, hue, saturation and lightness (HSL) or other methods can just as well be used to represent the color of each pixel. These methods for representing color are suitable for different circumstances.

In FIG. 2, the image 14 comprises a plurality of pixels 18 arranged into a matrix. The image 14 comprises an image region 20, which comprises several pixels 22, each with RGB parameters.

The image processing method of the image processing system 10 adjusts the RGB parameters for each pixel 22 according to a predetermined image adjusting method, and then uses a lowpass spatial filtering method or a median filtering method to adjust the RGB parameters for the entire image 14.

With the lowpass spatial filtering method, a parameter (e.g. the red parameter) of each predetermined neighboring pixel is added together, and the sum is divided by the number of parameters thus added to get an average. The resulting average parameter replaces the parameter of each neighboring pixel. With the median filtering method, a middle value of a parameter of a predetermined number of neighboring pixels is obtained, and the middle value replaces the parameter of each neighboring pixel. Neither of these two image-adjusting methods provides a satisfactory result because they blur edges, and create subtle distortions.

SUMMARY OF INVENTION

It is therefore a primary objective of this invention to solve the above-mentioned problem by using an image processing method that deals with images in a progressive manner.

Briefly, the present invention is an image processing method that is performed in an image processing system. The image processing system comprises a memory for storing programs, an unprocessed image, and a processor for executing the programs stored in the memory. The image comprises a matrix of pixels, each pixel having a set of parameters, including hue, saturation and lightness parameters. These parameters are adjusted by gradually changing an image adjusting value outside of an image region from the edge of the image region along a predetermined direction. In this method, the image in question contains a predetermined excluded region. Parameters within this excluded region are not adjusted.

It is an advantage of the present invention that by gradually changing the image adjusting value, the method does not blur edges or create the subtle image distortions of the prior art.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWINGS

FIGS. 5, 6, 7 are diagrams of adjusting values for red parameters of pixels in the image diagram of FIG. 4.

DETAILED DESCRIPTION OF THE PREFERRED EMBODIMENT

Figure 1:
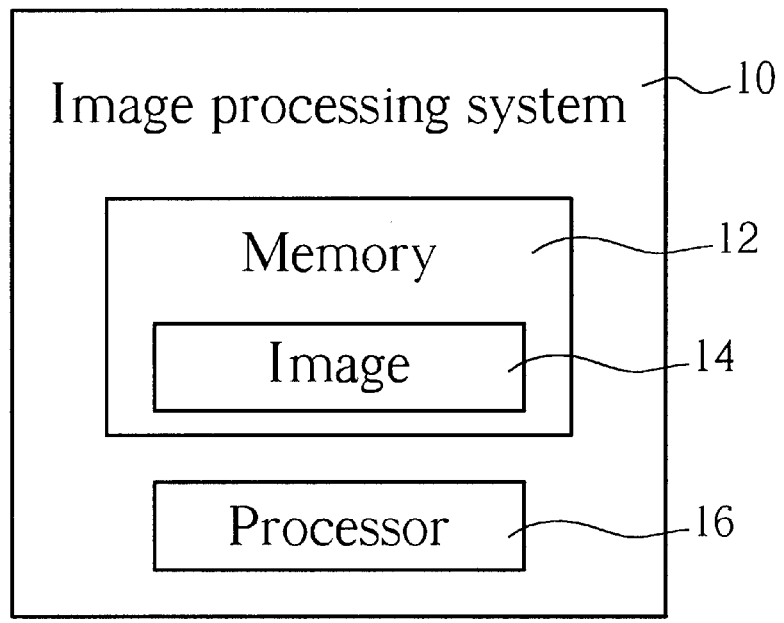
FIG. 1 is a block diagram of a prior art image processing system.
Figure 2:
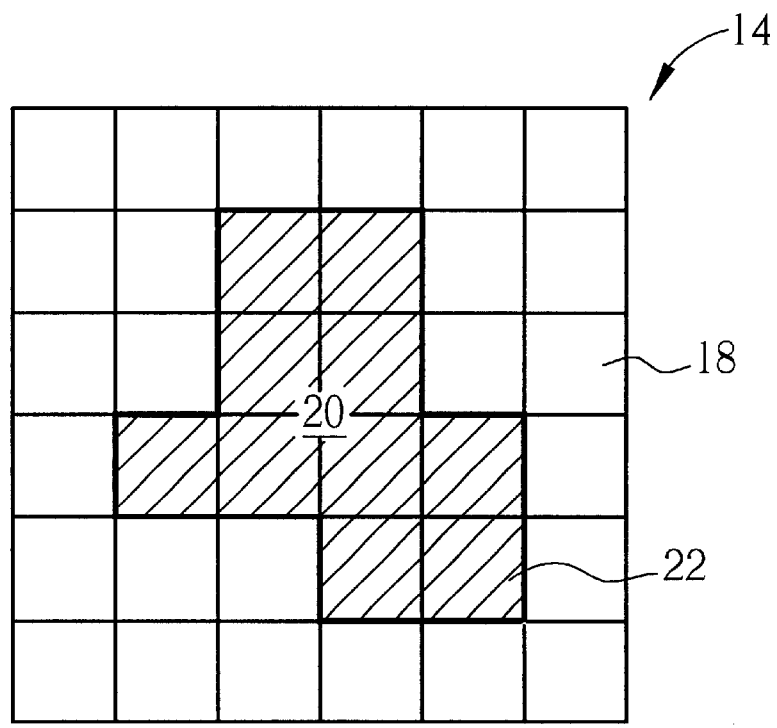
FIG. 2 is a diagram of an image for the image processing system of FIG. 1.
Figure 3:
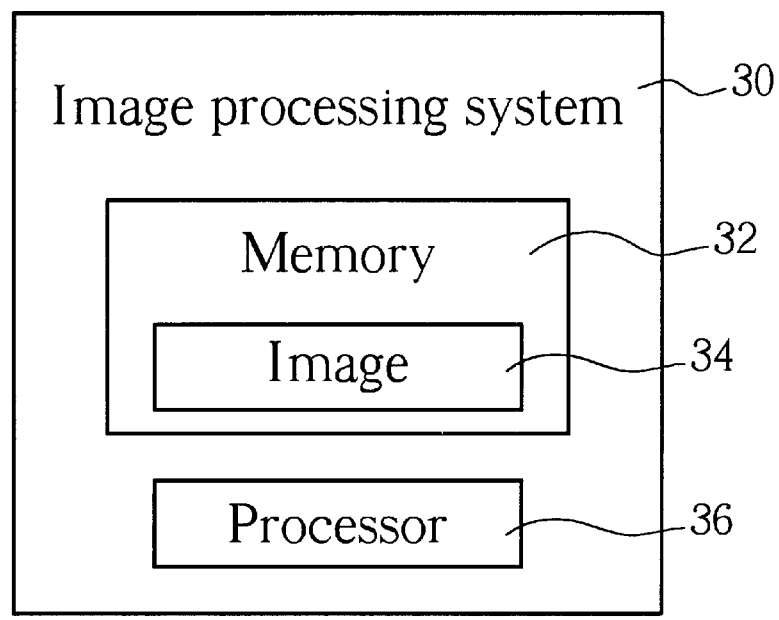
FIG. 3 is a block diagram of a present invention image processing system.
Figure 4:
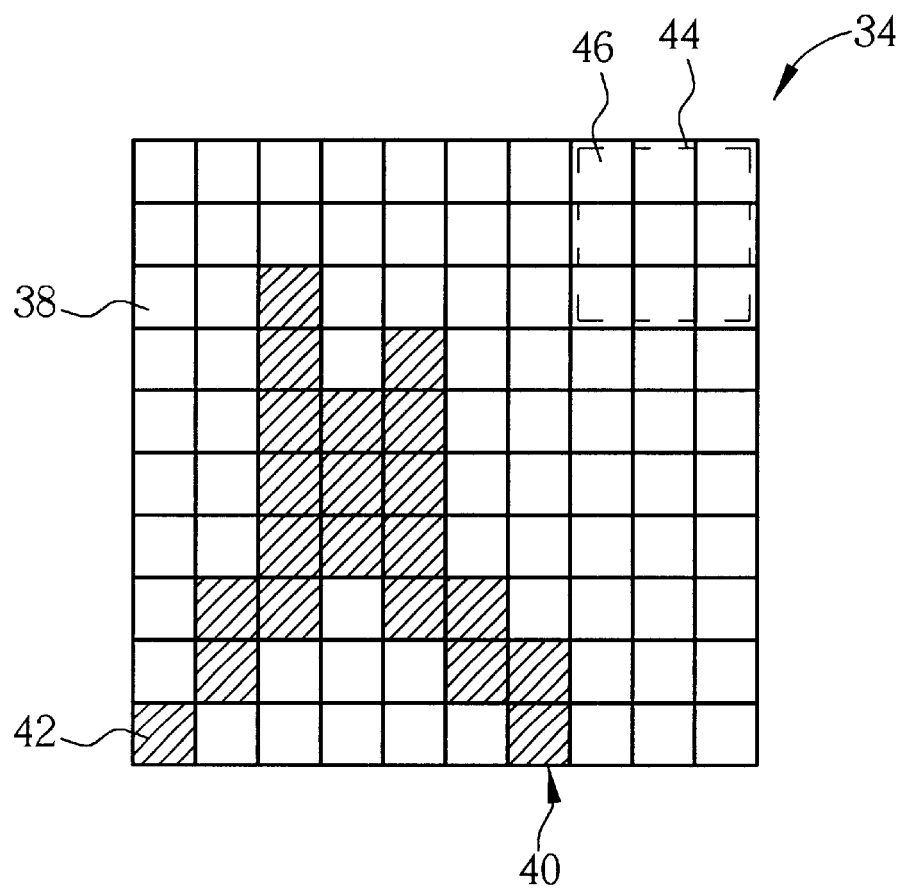
FIG. 4 is a diagram of an image in the image processing system of FIG. 3

Please refer to FIG. 3 and FIG. 4. FIG. 3 is a block diagram for an image processing system 30 of the present invention. FIG. 4 is a diagram of an image 34 of the image processing system 30. The image processing 30 comprises a memory 32 for storing programs and the unprocessed image 34, and a processor 36 for executing the programs in the memory 32.

The image 34 contains a plurality of pixels 38 organized in a matrix, and 24 bits are used to represent the RGB color of each pixel 38. 8 bits are used for each color parameter R, G, and B. The image 34 contains at last one image region 40 (the shaded area in FIG. 4), and the pixels 38 within this image region 40 all have similar color characteristics. For example, all of the pixels 38 of the image region 40 fall into the same skin color range.

In a preferred embodiment of the present invention, the following steps are performed:

1. Select a target parameter (e.g. the red parameter in the image region 40).

2. Adjust each parameter of each pixel 42 in the image 40 with a predetermined equation (for example, raise the value of the red parameter by 5).

3. In a predetermined direction of up, down, left or right, subtract a fixed value from a current image adjusting value, or multiply the image adjusting value by a fixed factor, to obtain the next image adjusting value for the current pixel, proceeding in this fashion from within the image 40 to its outer region. If the adjusting value for a target parameter is larger than that of the previous pixel, the parameter of the target pixel should not be adjusted.

The image 34 can have an excluded region 44 (the area within the dashed square in FIG. 4). When adjusting each parameter of each pixel in the predetermined direction, if a pixel 46 is located in the excluded region 44, the pixel 46 is not to be adjusted.

Figure 7:
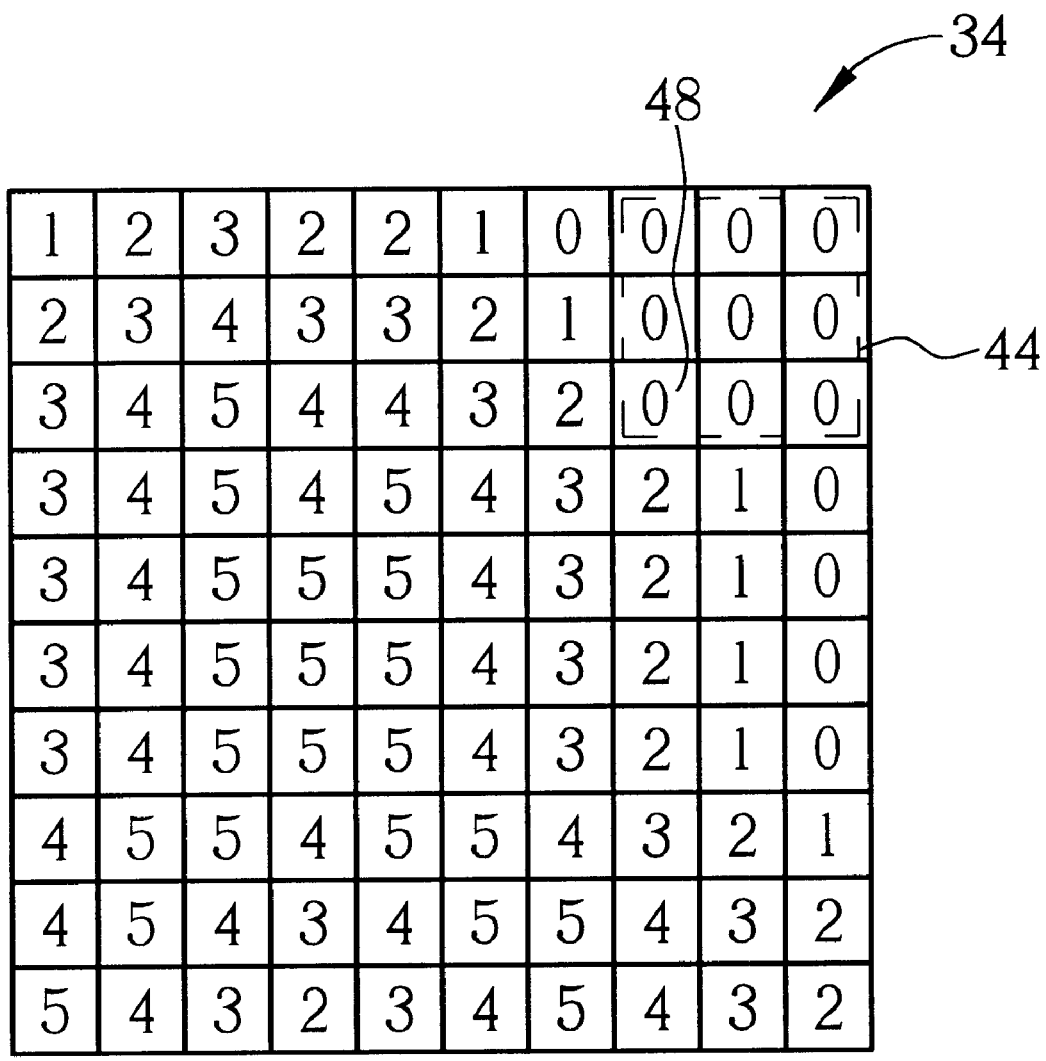

To better illustrate this invention, please refer to the example in FIG. 5 to FIG. 7. In this example, red is the targeted parameter. In FIG. 5, the red parameter of each pixel 42 in the image 40 is raised by 5, which is the maximum value of an adjusting value. If a smoothing range value of 5 is chosen, then the adjusting value for each red parameter is obtained by subtracting 1 (+5/5) from the previous adjusting value, proceeding outwards from the image 40. Therefore, the adjusting values for the red parameter of the pixels outside of the region 40 is 4, 3, 2, 1, and 0, successively. With a smoothing range value of 5, the red parameter of each pixel 42 in the image 40 are the original red value +5/5*the maximum adjusting value. The adjusting value in the outer image region, depending on the pixel distance from the image region 40, are successively adjusted to the original adjusting value +4/5*the maximum adjusted value, the original value +3/5*the maximum adjusting value, the original value +2/5*the maximum adjusting value, . . . etc. The maximum adjusting value is the adjusted value of the red parameter of the pixel 42, the denominator is the value of the smoothing range, and the numerator (5,4,3,2 . . . ) is the successively decremented value of the smoothing range. If the value of the smoothing range is set higher (e.g. 20), the outer region should, according to the pixel distance from the image region 40, be adjusted to the original value +19/20*the maximum adjusting value, the original value +18/20*the maximum adjusting value, the original value +17/20*the maximum adjusting value, etc Hence, a larger smoothing range value expands the subordinating image region. When the predetermined direction of the image adjustment is from the bottom-left corner to the upper-right corner, the image 34 would be adjusted as depicted in FIG. 6. The following is a more detailed description of the image 34 adjusting process.

The adjusting value for the red parameter of pixel 52 is 5, so the estimated adjusting value for the red parameter of pixel 50 on the right is 4. Since the original adjusting value of the pixel 50 is 0, smaller than the estimated adjusting value 4, the adjusting value of the red parameter of the pixel 50 is set to 4.

The adjusting value of the red parameter for the pixel 50 is 4, so the estimated red parameter adjusting value for the pixel to the right, pixel 54, is 3. Since the adjusting value of the pixel 54 is zero, smaller than the estimated adjusting value 3, the adjusting value of the red parameter of the pixel 54 is set to 3.

Proceeding upwards, the adjusting value of the red parameter for the pixel 50 is 4, so the estimated adjusting value of the red parameter of pixel 56 is 3. Since the adjusting value of the red parameter of the pixel 56 is 5, larger than the estimated adjusting value 3, the adjusting value of the red parameter of the pixel 56 remains 5.

However, when adjusting the image 34 in the upper-right direction, the image 34 still might have large contrasts. For example, in FIG. 6, although pixel 64 and pixel 58 are adjacent, the difference in their adjusting values turns out to be 5. The adjusting value of pixel 58 is not adjusted because it is larger than the adjusting value of pixel 64, which is 0.

In order to avoid such sharp contrasts in the image 34, the image 34 in FIG. 6 should be readjusted by performing the adjusting algorithm again from the upper-right corner to bottom-left corner. FIG. 7 shows the result. The more detailed explanation is stated below.

The adjusting value for the red parameter of pixel 62 is 5, so the estimated adjusting value for the red parameter of the pixel 60 should be 4. Since the adjusting value for the pixel 60 is originally 5, greater than the estimated adjusting value 4, the adjusting value of the red parameter of the pixel 60 remains 5.

Because the adjusting value of the red parameter of the pixel 62 is 5, the estimated adjusting value of the pixel 58 should be 4. But again, as the adjusting value of the red parameter of the pixel 58 is 5, greater than the estimated adjusting value of 4, it is not changed and remains 5.

The adjusting value of the red parameter of the pixel 58 is 5, so the adjusting value pixel 64 is estimated to be 4. Since the adjusting value of the red parameter of the pixel 64 is originally 0, smaller than the estimated adjusting value 4, it is changed to 4.

Because the image adjustments of FIG. 6 in FIG. 7 proceed from the upper-right corner to the bottom-left corner, and because the adjusting value, 0, of the pixel 64 is smaller than the adjusting value, 5, of the pixel 58 and 60, the adjusting value of the pixel 64 is set 4, solving the problem of possible high bit contrasts in the image 34. Additionally, since pixel 48 is located in the excluded region 44, the pixel 48 is not adjusted, regardless of whether the image adjustment proceeds from the bottom-left corner to the upper-right corner or the other way around. FIG. 7 shows that the difference of the adjusting values between any two neighboring pixels is 1, which means that there would not be any strong contrast in or out of the image region 40, resulting in an esthetically harmonious and balanced image.

In a sample operation of this invention, if the red parameter of the pixel 42 in the image region 40 is adjusted up by 10 (+10), the red adjustment parameters in the outer image region would be between 0 and +10. If the smooth range is set to 5, the adjusting values in the outer region are, according to the distance from the image region 40, adjusted to the original value +4/5*10, the original value +3/5*10, the original value +2/5*10 . . . etc. In other words, the red parameter of the closest pixel to the image region 40 is increased by 8, the next one by 6, and then by 4, 2, and 0, successively.

If the red parameter of the pixel 42 in the image region 40 is lowered by 10 (−10), the adjusting value in the outer region would be between 0 and −10. If the smooth range is set to 5, the parameters in the outer region are, depending on their pixel distance from the image region 40, adjusted to their original value +4/5*(−10), their original value +3/5* (−10), their original value +2/5* (−10) . . . etc. In other words, the red parameter of the pixel closest to the image region 40 is decreased by 8, and the next one by 6, and then by 4, 2, and 0, successively.

If the red parameter of the pixel 42 in the image region 40 is not adjusted, that is, the greatest adjusting value is 0, and if the smooth range is set to 5, the parameters in the outer region are, depending on its distance from the image region 40, adjusted to the original value +4/5*0, the original value +3/5*0, the original value +2/5*0 . . . etc. As a result, the red parameters of pixels outside of the image region 40 should remain the same.

In the examples described above, the parameters in the region outside of the image region 40 are adjusted by adding or subtracting a fixed value to the original values; however, these can also be adjusted by multiplying or dividing by a fixed value to the original values.

The image process method in the image process system 30 processes images progressively from within the image region 40 to the outer region; as a result, not only are the features of the image region 40 presented clearly, but also the image 34 has an esthetically harmonious effect.

The sample operation above is performed based on the example of the red parameter; however, the present invention can be used to adjust the green parameter, the blue parameter, or multiple parameters among the parameters of red, green and blue.

The operation of the invention described above uses red, green and blue parameters to present the color of each pixel; however, this invention may also use hue (H), saturation (S), and lightness (L) parameters, or other kinds of color parameters, with equal success.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image processing method that is performed in an image processing system, which comprises a memory for storing programs, and an unprocessed image, and a processor for executing the programs in the memory, the unprocessed image having an image region and comprising a plurality of pixels arranged as a matrix, and each pixel has a parameter with a predetermined number, the image processing method comprising:

adjusting the parameter of each pixel in the image region according to a predetermined image adjusting value; and gradually changing the image adjusting value outside of the image region from the edge of the image region along a predetermined direction, and adjusting the parameter of pixels outside of the image region according to the changed image adjusting value.

2. The image processing method of claim 1 wherein the predetermined direction can be one of up, down, left, or right within the matrix of pixels.

3. The image processing method of claim 1 wherein a succeeding value of the image adjusting value for a succeeding pixel outside of the image region is obtained by adding, subtracting, dividing or multiplying a fixed value to the current value of the image adjusting value of the current pixel.

4. The image processing method of claim 1 wherein each pixel comprises its hue, saturation, and lightness as its parameters, and the image processing method adjust these parameters.

5. The image processing method of claim 1 wherein the image includes at least one predetermined excluded region; wherein when adjusting the parameter of each pixel along the predetermined direction, if a pixel is positioned within the excluded region, the parameter of the pixel will not be adjusted, nor will any succeeding pixels after the pixel.

6. The image processing method of claim 1 wherein all pixels in the image region are all within a predetermined skin color range.

7. An image processing method that is performed in an image processing system, the image processing system comprising a memory for storing programs, and an unprocessed image, and a processor for executing the programs in the memory, wherein the unprocessed image having an image region and comprising a plurality of pixels arranged as a matrix, each pixel having parameters with a predetermined number, the image processing method comprising the steps of:

(a) selecting one of the parameters as a target parameter;
(b) setting a smooth range value;
(c) adjusting the target parameter of each pixel in the image region according to a predetermined image adjusting value; and
(d) gradually changing the image adjusting value outside of the image region with a fixed value from the edge of the image region along a predetermined direction, and adjusting the parameter of pixels outside of the image region according to the changed image adjusting value, wherein the fixed value is determined by dividing the smooth range value by the predetermined image adjusting value.

8. The image processing method of claim 7 wherein the predetermined direction can be one of up, down, left, or right within the matrix of pixels.

9. The image processing method of claim 7 wherein a succeeding value of the image adjusting value for a succeeding pixel outside of the image region is obtained by adding, by subtracting, by multiplying or by dividing the fixed value to the current value of the image adjusting value of the current pixel.

10. The image processing method of claim 7 wherein each pixel comprises its hue, saturation, and lightness as its parameters, and the image processing method adjust these parameters.

11. The image processing method of claim 7 wherein the image includes at least one predetermined excluded region; wherein when adjusting the parameter of each pixel along the predetermined direction, if a pixel is positioned within the excluded region, the parameter of the pixel will not be adjusted, nor will any succeeding pixels after the pixel.

12. The image processing method of claim 7 wherein all pixels in the image region are all within a predetermined skin color range.

13. The image processing method of claim 7, further comprising performing (a) to (d) steps again along a direction contrary to the predetermined direction to avoid sharp contracts.

* * * * *